US009091117B2

(12) United States Patent
Ng

(10) Patent No.: US 9,091,117 B2
(45) Date of Patent: Jul. 28, 2015

(54) UNIVERSAL CHILD SAFETY TENSIONER FOR ROLLER BLIND

(76) Inventor: Philip Ng, Thornhill (CA)

( * ) Notice: Subject to any disclaimer, the term of this patent is extended or adjusted under 35 U.S.C. 154(b) by 0 days.

(21) Appl. No.: 12/869,210

(22) Filed: Aug. 26, 2010

(65) Prior Publication Data

US 2012/0094794 A1 Apr. 19, 2012

(51) Int. Cl.

| | |
|---|---|
| ***E06B 9/56*** | (2006.01) |
| ***A47G 5/02*** | (2006.01) |
| ***A47H 1/00*** | (2006.01) |
| ***A44B 1/04*** | (2006.01) |
| ***A44B 11/25*** | (2006.01) |
| ***A44B 17/00*** | (2006.01) |
| ***F16G 11/00*** | (2006.01) |
| ***E06B 9/42*** | (2006.01) |
| *E06B 9/326* | (2006.01) |
| *E06B 9/78* | (2006.01) |

(52) U.S. Cl.
CPC . *E06B 9/42* (2013.01); *E06B 9/326* (2013.01); *E06B 9/78* (2013.01); *E06B 2009/3265* (2013.01)

(58) Field of Classification Search
CPC ............ E06B 9/78; E06B 9/326; F16G 11/04
USPC ............. 160/173 R, 168.1 R, 168.1 V, 173 V, 160/178.1 V, 178.1 R, 321, 323, 344; 24/115 G, 116 R, 116 A, 136 R, 712.5, 24/712.7; 474/140, 171
See application file for complete search history.

(56) References Cited

U.S. PATENT DOCUMENTS

| | | | | |
|---|---|---|---|---|
| 5,163,492 | A * | 11/1992 | Remington et al. | 160/176.1 V |
| 5,845,696 | A * | 12/1998 | Chou | 160/178.1 V |
| 6,085,824 | A * | 7/2000 | Cadorette | 160/177 V |
| 6,792,999 | B2 * | 9/2004 | Cross et al. | 160/321 |
| D591,993 | S * | 5/2009 | Chou | D6/581 |
| 7,931,069 | B2 * | 4/2011 | Cannaverde et al. | 160/173 R |
| 8,246,007 | B2 * | 8/2012 | Manvel | 254/1 |
| 8,286,686 | B2 * | 10/2012 | Cannaverde | 160/320 |
| 8,499,814 | B2 * | 8/2013 | Ng | 160/173 R |
| 8,650,720 | B2 * | 2/2014 | Wicker et al. | 24/115 G |
| 8,695,680 | B2 * | 4/2014 | Cannaverde | 160/321 |

* cited by examiner

*Primary Examiner* — Katherine Mitchell
*Assistant Examiner* — Jeremy Ramsey
(74) *Attorney, Agent, or Firm* — Elias Borges

(57) ABSTRACT

The present invention is a tensioner for securing a loop of roller blind chain to a window frame and to a wall adjacent the window frame. The tensioner includes a member having a top portion with a peripheral edge, a bottom portion, opposite end portions, opposite side portions, and a central aperture passing through the opposite side portions and positioned between the opposite end portions and between the top and bottom portions. The central aperture is dimensioned to permit the roller blind chain to pass there through. The member has a first thickness separating the opposite first and second sides of the member and a second thickness between the central aperture and the peripheral edge, the first thickness and the second thickness each being greater than the distance separating the beads of the chain. The member is configured such that the member is mountable in both a vertical orientation on the window frame wherein the opposite side portions are oriented in horizontal alignment and the end portions are oriented in vertical alignment and a horizontal orientation wherein the opposite side portions are oriented in vertical alignment and the end portions are oriented in horizontal alignment. Finally, the top portion of the member is curved such that the loop of roller chain is positioned perpendicular to the wall when the member is mounted in its horizontal orientation.

9 Claims, 3 Drawing Sheets

A
A

Fig. 5
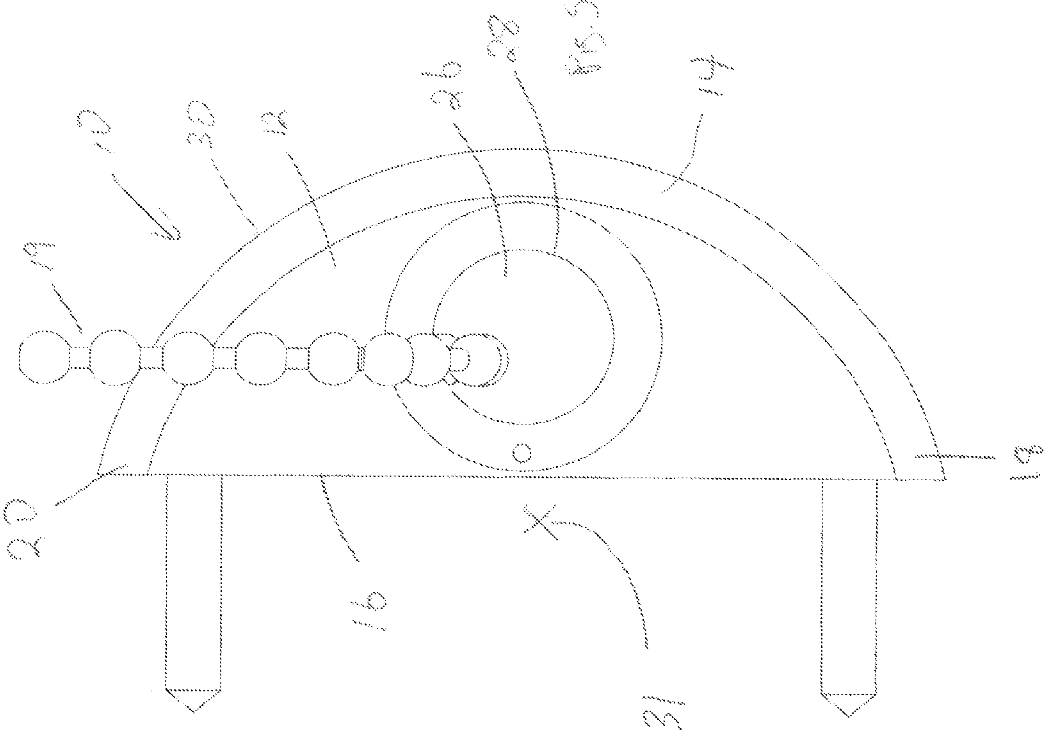
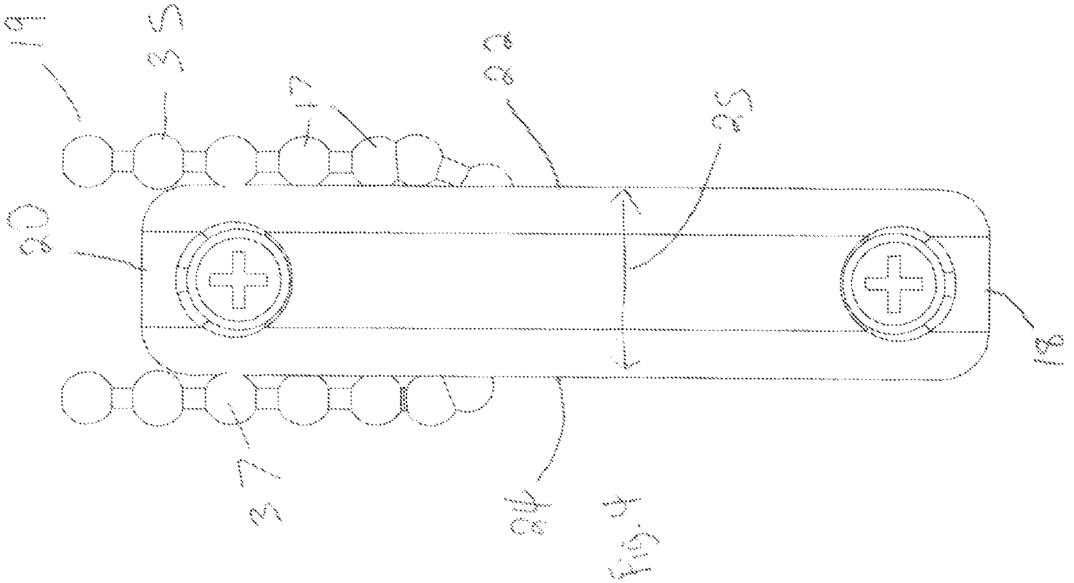
Fig. 4

UNIVERSAL CHILD SAFETY TENSIONER FOR ROLLER BLIND

FIELD OF THE INVENTION

The invention relates generally to tensioners for keeping a blind chain taught against a wall or window frame.

BACKGROUND OF THE INVENTION

Roller shades generally use a long loop of beaded cord (called a roller chain) as part of the shade control mechanism. The roller chain is coupled to a control unit which engages the roller tube upon which the blind is rolled. Pulling on the roller chain causes the control unit to rotate the roller tube so as to raise or lower the blind as required. Since the control unit is mounted at the top of the blind, the chain must be sufficiently long to be easily accessible to the user. This results in a long loop of chain which hangs down from the control unit. In order to prevent a child from accidentally choking on the loop of roller chain, a tensioner is provided for securing the bottom end of the chain against a wall or window frame.

The tensioner is often mounted inside the window frame such that the loop of roller chain hangs down with both lines parallel. It is important to keep the lines of the roller chain parallel. If the lines of the roller chain cross, then there is an increased chance that the roller control mechanism might jam. If the tensioner is to be mounted outside the window frame (such as against a wall adjacent the window opening) then a special adapter bracket is generally required to orient the tensioner such that the lines of the roller chain remain parallel and do not cross. In order to minimize the complexity of the assembly of the blind, and to provide a clean look, a universal tensioner is required which permits for inside or outside mounting without causing the lines of the roller chain to cross.

SUMMARY OF THE INVENTION

In accordance with one aspect of the present invention, there is provided a tensioner for use with a roller blind chain, the tensioner permitting easy mounting to both the inside frame of the window and to the wall outside the window frame. The tensioner includes a member having a curved arch shaped top portion with a peripheral edge, a bottom portion, opposite end portions, opposite side portions, and a central aperture passing through the opposite side portions and positioned between the opposite end portions and between the top and bottom portions. The central aperture is dimensioned to permit the roller blind chain to pass through the central aperture. The member has a first thickness separating the opposite first and second sides of the member and a second thickness between the central aperture and the peripheral edge, the first thickness being substantially equal to the second thickness and both the first and second thicknesses being greater than the distance separating the beads of the chain.

In accordance with another aspect of the present invention, there is provided a tensioner for securing a roller blind chain to a window frame and to a wall adjacent the window frame. The tensioner can be oriented for securing the roller blind chain to either the window frame (inside mounting) or to the wall (outside mounting) while at the same time ensuring that the roller blind chain is not twisted. The tensioner includes a member having a curved arch shaped top portion with a peripheral edge, a bottom portion, opposite end portions, opposite side portions, and a central aperture passing through the opposite side portions and positioned between the opposite end portions and between the top and bottom portions. The central aperture is dimensioned to permit the roller blind chain to pass there through. The member has a first thickness separating the opposite first and second sides of the member and a second thickness between the central aperture and the peripheral edge, the first thickness and the second thickness each being greater than the distance separating the beads of the chain. The member is symmetrical such that the member is mountable in both a vertical orientation on the window frame wherein the opposite side portions are oriented in horizontal alignment and the end portions are oriented in vertical alignment and a horizontal orientation wherein the opposite side portions are oriented in vertical alignment and the end portions are oriented in horizontal alignment.

In accordance with another aspect of the present invention, there is provided a tensioner for securing a loop of roller blind chain to a window frame and to a wall adjacent the window frame. The tensioner includes a member having a top portion with a peripheral edge, a bottom portion, opposite end portions, opposite side portions, and a central aperture passing through the opposite side portions and positioned between the opposite end portions and between the top and bottom portions. The central aperture is dimensioned to permit the roller blind chain to pass there through. The member has a first thickness separating the opposite first and second sides of the member and a second thickness between the central aperture and the peripheral edge, the first thickness and the second thickness each being greater than the distance separating the beads of the chain. The member is configured such that the member is mountable in both a vertical orientation on the window frame wherein the opposite side portions are oriented in horizontal alignment and the end portions are oriented in vertical alignment and a horizontal orientation wherein the opposite side portions are oriented in vertical alignment and the end portions are oriented in horizontal alignment. Finally, the top portion of the member is curved such that the loop of roller chain is positioned perpendicular to the wall when the member is mounted in its horizontal orientation.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

FIG. 4 is a front view of the roller chain tensioner shown in FIG. 1 but mounted in a vertical orientation for mounting inside a window frame.

FIG. 5 is a side view of the roller chain tensioner shown in FIG. 4.

In the drawings like characters of reference indicate corresponding parts in the different figures.

DETAILED DESCRIPTION OF THE INVENTION

Figures 1, 2, 3:
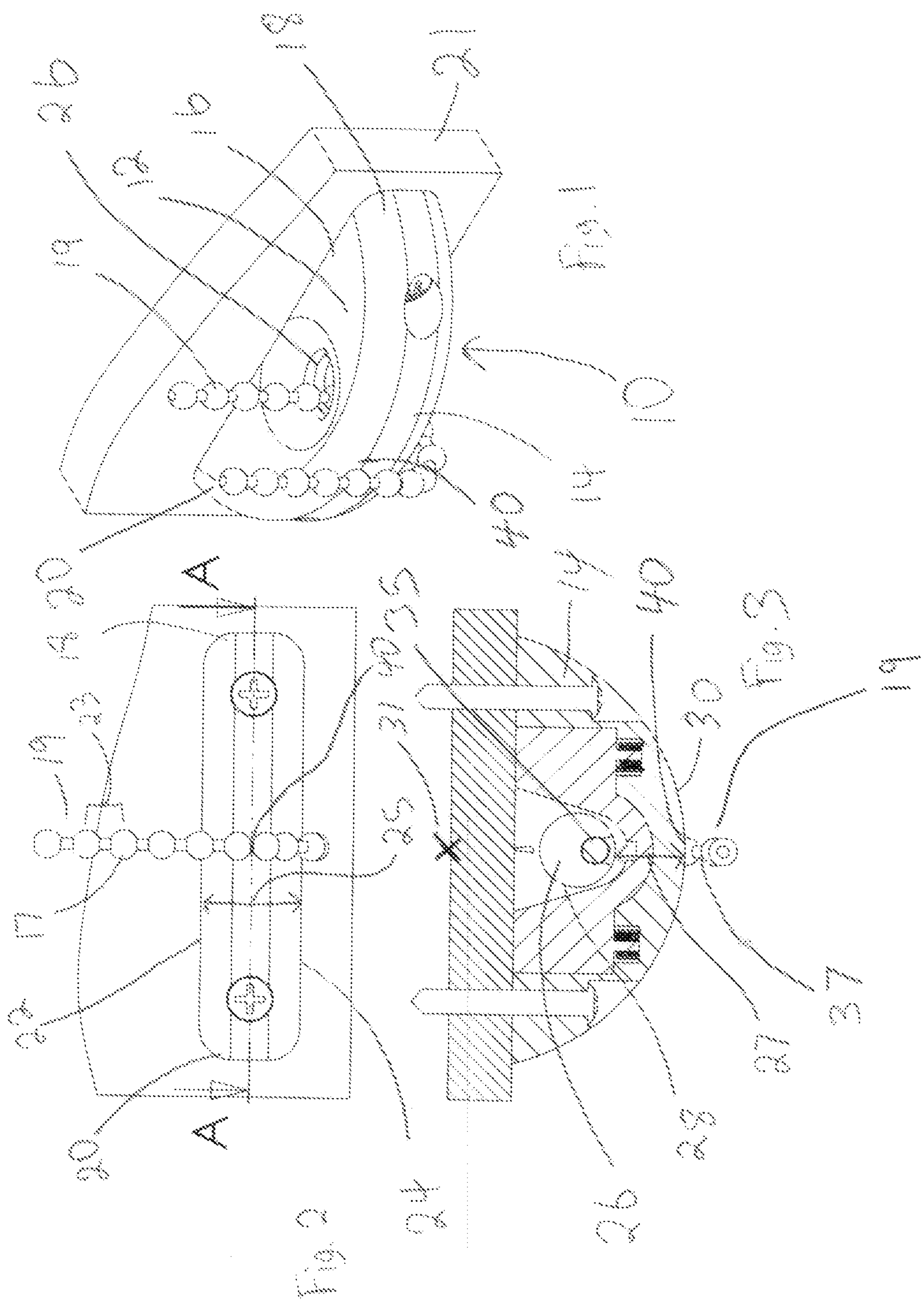
FIG. 1 is a perspective view of a roller chain tensioner made in accordance with the invention mounted in a horizontal orientation for mounting outside a window frame.
FIG. 2 is front view of the roller chain tensioner shown in FIG. 1.
FIG. 3 is a sectional view of the roller chain tensioner shown in FIG. 1 taken through line A-A in FIG. 2.

Referring to FIGS. 1, 2 and 3, a tensioner made accordance with one aspect of the present invention is shown generally as item 10 and consists of a member 12 having a top portion 14, bottom portion 16, opposite end portions 18 and 20 and opposite sides 22 and 24. Central aperture 26 is provided in member 12 between top portion 14 and bottom 16 and between ends 18 and 20. Central aperture 26 passes from opposite sides 22 and 24 and is dimensioned to permit roller chain 19 to pass there through. Member 12 has a thickness 25 between opposite sides 22 and 24 which is greater than distance 23 between the beads 17 forming roller chain 19. Member 12 also has a thickness 27 extending from peripheral edge 28 of aperture 26 and peripheral edge 30 of top portion 14. Thickness 27 is also greater than distance 23. Preferably, thickness 27 is substantially equal to thickness 25.

As is clearly shown in FIGS. 1 and 2, housing 12 is mountable to wall 21 in a horizontal orientation, wherein opposite sides 22 and 24 are in vertical alignment (i.e. one side is above the other opposite side). Top portion 14 of member 12 is configured in the form of a curve or arch and preferably in the form of a semi-circle having a center point 31. Central aperture 26 is positioned to one side of center point 31 and, more particularly, the central aperture is positioned between the center point and peripheral edge 30. The curved surface of top portion 14 ensures that chain 19 is positioned towards center point 40 of member 12. Chain loop 19 has an inner strand 35 and an outer strand 37. When chain loop 19 is pulled taught by member 12, inner strand 35 is constrained by the peripheral edge 28 of central aperture 26. Likewise, when chain loop 19 is pulled taught by member 12, outer strand 37 is urged towards center point 40 by the curved shape of peripheral edge 30. The shortest distance between strands 35 and 37 is at point 40 which corresponds to thickness 27. Since the shortest distance between the strands is at point 40, pulling chain 19 taught with member 12 in its horizontal mounting position places both strands 35 and 37 at point 40, keeping the strands of the loop parallel and thereby preventing the strands from crossing.

As seen in FIGS. 4 and 5, tensioner 10 is capable of being mounted in a vertical orientation, where opposite side portions 24 and 22 are horizontal to one another (i.e. they are in side by side horizontal orientation) and ends 20 and 18 are vertical to one another (i.e. one end is above the other end). This mounting orientation is particularly useful for mounting the tensioner to the inside of a window frame (i.e. an inside mounting). In this orientation, strands 35 and 37 are naturally kept parallel and prevented from crossing. The strands are separated by thickness 25 which is sufficiently great to permit beads 17 to pass through aperture 26 without being caught on peripheral edge 28. Preferably peripheral edge 28 is rounded to permit the smooth passage of chain 19. Curved peripheral edge 30 of upper portion 14 also ensures that member 12 does not have any sharp projections. It is very clear from the view in FIG. 5 that aperture 26 is positioned to one side of center point 31 and between the center point and peripheral edge 30.

Figure 6:
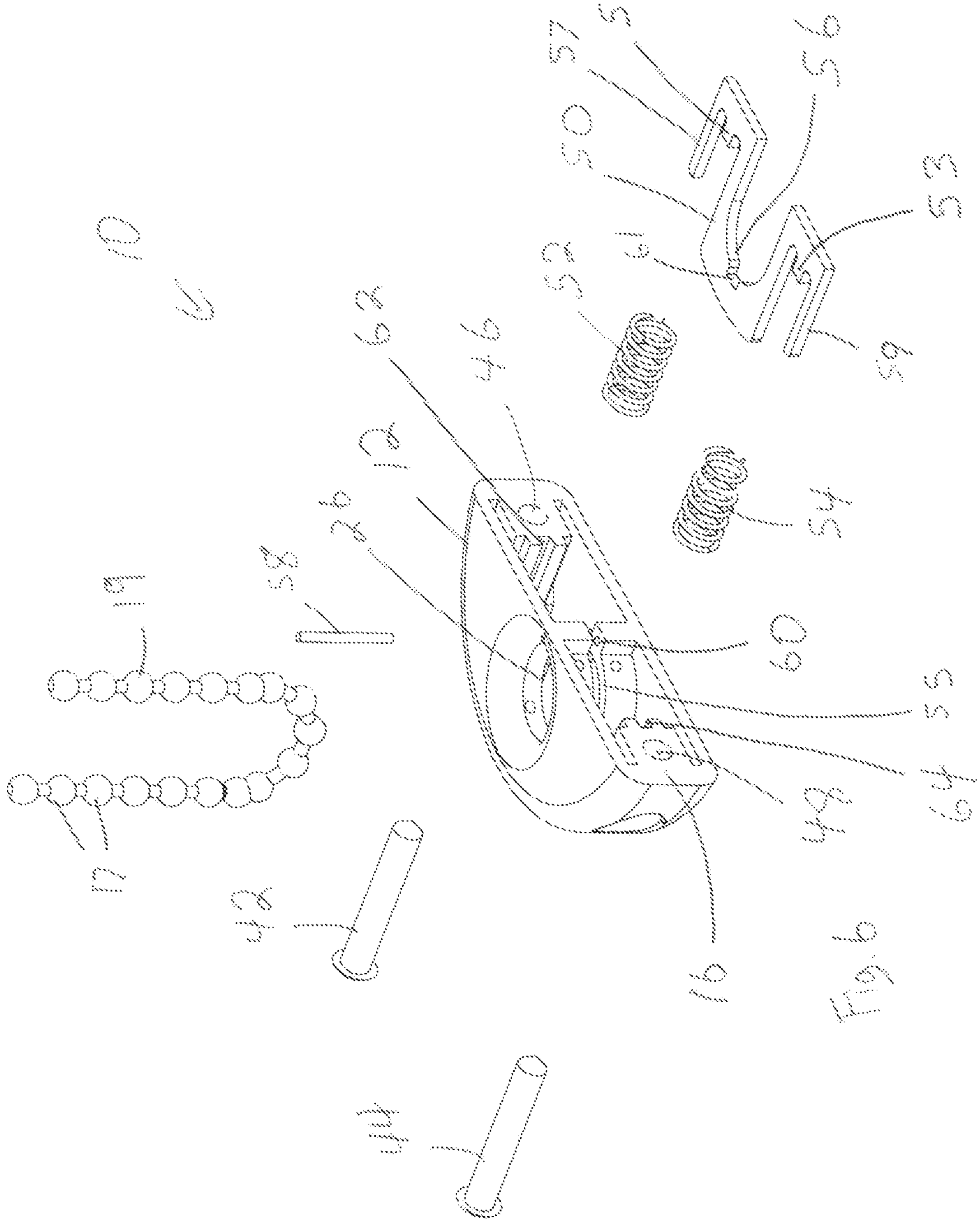
FIG. 6 is an exploded view of the roller chain tensioner made in accordance with the present invention.

Referring now to FIG. 6, tensioner 10 is preferably provided with an automatic chain locking mechanism which locks the chain in the tensioner when the tensioner comes loose off the wall or window frame (not shown). The automatic locking mechanism includes blade 50 having prongs 51 and 53 to which springs 52 and 54, respectively, are attached. Blade 50 is slidingly received in slot 55 with slots 62 and 64 receiving projections 57 and 59. After blade 50 and springs 52 and 54 are inserted into member 12, retainer member 58 is inserted through aperture 60 to keep blade 50 from falling out of member 12. Springs 52 and 54 bias blade 50 such that portion 56 of the blade projects into aperture 26 until member 12 is firmly mounted to a wall or window frame (not shown). To mount member 12, bottom portion 16 is positioned towards the wall/window frame (not shown) and then screws 42 and 44 are passed through apertures 46 and 48 to screw into the supporting wall/window frame. As member 12 is mounted to the wall, bottom portion 16 begins to make contact with the supporting wall/window frame and blade 50 is forced deeper into the member, thereby clearing aperture 26. Roller chain 19 may then be free to pass through aperture 26 unobstructed. However, in the event screws 42 and 44 become loose, blade 50 moves to obstruct aperture 26 and chain 19 becomes locked within member 12. Notch 61 is provided on blade 50 to ensure that chain 19 is grasped firmly between beads 17 when the tensioner is loose.

Referring back to FIG. 1, the present invention has several advantages over the prior art. In particular, the tensioner can be mounted in either an inside mount orientation (i.e. inside the window frame) simply by mounting the tensioner in a vertical orientation. The same tensioner can also be mounted outside of the window frame (i.e. to a wall adjacent the window frame) simply by turning the tensioner 90° into a horizontal orientation (as shown in FIG. 1). The curved shape of the upper portion 14 of member 12 keeps the strands of the chain from crossing by keeping them parallel. Hence, the tensioner does away with the need for separate mounting brackets.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

Therefore, what is claimed is:

1. A tensioner for securing a roller blind chain to a window frame and to a wall adjacent the window frame, the roller blind chain including a plurality of beads on a line, each bead being separated by a distance, the tensioner comprising:

a. A flat member having an approximately semi-circular shape with a curved arch shaped top portion with a peripheral edge, a planar flat bottom portion opposite the arch shaped top portion, the planar flat bottom having opposite end portions, the flat member having opposite parallel flat side surfaces, and a central aperture passing perpendicularly through the parallel opposite side surfaces, the central aperture positioned between the opposite end portions and between the top and bottom portions;

b. The central aperture being dimensioned to permit the roller blind chain to pass there through;

c. The flat member having a first thickness separating the opposite parallel side portions of the flat member and a second thickness between the central aperture and the peripheral edge, the first thickness being substantially equal to the second thickness and both the first and second thicknesses being greater than the distance separating the beads of the chain;

d. A blade member slidingly mounted within the flat member between the parallel side portions, the blade member being U shaped and having a central opening dimensioned to be coaxially aligned with the central aperture when the blade is fully contained within the flat member, a notch formed on the blade member adjacent the central opening;

e. the blade member being configured to be fully contained within in the flat member when the planar flat bottom of the flat member is securely mounted and flush to the window frame or wall adjacent the window frame, the blade member biased towards a position wherein the notch on the blade grasps the roller blade chain between the beads when the planar flat bottom of the flat member is not securely mounted to the window frame or wall and is not flush therewith.

2. The tensioner of claim 1 wherein the top portion is arched between the opposite end portions and wherein the blade member has receiving projections formed on opposite sides of the blade, the blade having a compression spring mounted over each receiving projection, the flat member, compression springs and blade configured such that the compression springs bias the blade.

3. The tensioner of claim 2 wherein the flat member has a pair of screw apertures positioned adjacent the opposite ends, the screw apertures oriented perpendicular to the central aperture, the screw apertures each being dimensioned to receive a mounting screw, the blade member being positioned between the screw apertures such that the compression springs are positioned between the screw apertures.

4. A tensioner for securing a roller blind chain to a window frame and to a wall adjacent the window frame, the roller blind chain including a plurality of beads on a line, each bead being separated by a distance, the tensioner comprising:

a. A flat member having an approximately semi-circular shape with a curved arch shaped top portion with a peripheral edge, a flat planar bottom portion opposite the arch shaped top portion, the flat planar bottom portion having opposite end portions, the flat member having opposite parallel side surfaces, and a central aperture passing perpendicularly through the opposite side surfaces, the central aperture positioned between the opposite end portions and between the top and bottom portions;

b. The central aperture being dimensioned to permit the roller blind chain to pass there through;

c. The flat member having a first thickness separating the opposite sides surfaces of the member and a second thickness between the central aperture and the peripheral edge, the first thickness and the second thickness each being greater than the distance separating the beads of the chain;

d. The flat member being symmetrical such that the member is mountable in both a vertical orientation on the window frame wherein the end portions are oriented in vertical alignment with one end portion above the other, and a horizontal orientation wherein the end portions are oriented in horizontal alignment;

e. A blade member slidingly mounted within the flat member between the parallel side portions, the blade member having a central opening dimensioned to be coaxially aligned with the central aperture when the blade is fully contained within the flat member;

f. the blade member being configured to be fully contained within in the flat member when the planar flat bottom of the flat member is securely mounted and flush to the window frame or wall adjacent the window frame, the blade member biased towards a position wherein a portion of the blade grasps the roller blade chain between the beads when the planar flat bottom of the flat member is not securely mounted to the window frame or wall and is not flush therewith, and g. and wherein the blade member has receiving projections formed on opposite sides of the blade with the central opening positioned between the receiving projections, the blade having a compression spring mounted to each receiving projection, the flat member, compression springs m and blade configured such that the compression springs bias the blade.

5. The tensioner of claim 4 wherein the bottom portion is flat and configured to rest flush against the wall and the window frame.

6. The tensioner of claim 5 wherein the top portion is arched between the opposite end portions.

7. The tensioner of claim 6 wherein the member has a pair of screw apertures positioned adjacent the opposite ends, the screw apertures oriented perpendicular to the central aperture, the screw apertures each being dimensioned to receive a mounting screw, the blade member being positioned between the screw apertures.

8. The tensioner defined in claim 4 wherein the curve of the top portion defines an arch having a center point, the central aperture being positioned between the center point and the peripheral edge.

9. The tensioner defined in claim 1 wherein the curve of the top portion defines an arch having a center point, the central aperture being positioned between the center point and the peripheral edge.

* * * * *